(12) United States Patent
Veno et al.

(10) Patent No.: US 7,317,593 B1
(45) Date of Patent: Jan. 8, 2008

(54) TAPE CARTRIDGE WITH PIVOTABLE ACCESS DOOR

(75) Inventors: William T. Veno, Thornton, CO (US); Phillip M. Morgan, Berthoud, CO (US); William J. Vanderheyden, Loveland, CO (US)

(73) Assignee: Storage Technology Corporation, Louisville, CO (US)

( * ) Notice: Subject to any disclaimer, the term of this patent is extended or adjusted under 35 U.S.C. 154(b) by 376 days.

(21) Appl. No.: 10/972,823

(22) Filed: Oct. 25, 2004

Related U.S. Application Data (60) Provisional application No. 60/517,713, filed on Nov. 5, 2003.

(51) Int. Cl.
*G11B 23/02* (2006.01)
(52) U.S. Cl. ...................................... 360/132
(58) Field of Classification Search ............... 360/132, 360/134, 60, 94, 133; 242/346, 348.2
See application file for complete search history.

(56) References Cited

U.S. PATENT DOCUMENTS

| | | | |
|---|---|---|---|
| 3,293,682 A | 12/1966 | Giles | |
| 3,594,512 A | 7/1971 | Castagna | |
| 3,764,088 A | 10/1973 | Yamada et al. | |
| 3,807,652 A | 4/1974 | Kruhn et al. | |
| 3,980,254 A | 9/1976 | Coon et al. | |
| 4,045,821 A | 8/1977 | Fujikura | |
| 4,399,480 A | 8/1983 | Edwards | |
| 4,556,923 A | 12/1985 | Olmsted | |
| 4,559,575 A | 12/1985 | Noto et al. | |
| 4,572,460 A | 2/1986 | Hertrich | |
| 4,586,095 A | 4/1986 | Olmsted | |
| 5,237,469 A | 8/1993 | Kukreja et al. | |
| 5,239,437 A * | 8/1993 | Hoge et al. | 360/132 |
| 5,294,072 A * | 3/1994 | East et al. | 242/346 |
| 5,297,755 A | 3/1994 | Felde et al. | |
| 5,332,173 A | 7/1994 | Kubota et al. | |
| 5,492,284 A | 2/1996 | Sorensen | |
| 5,557,484 A | 9/1996 | Leonhardt et al. | |
| 5,610,789 A * | 3/1997 | Miller | 360/132 |
| 5,660,345 A | 8/1997 | Buckland et al. | |
| 5,868,333 A | 2/1999 | Nayak | |
| 6,003,802 A | 12/1999 | Eaton et al. | |
| 6,031,675 A * | 2/2000 | Sanpei et al. | 360/60 |

(Continued)

FOREIGN PATENT DOCUMENTS

JP            11007749 A  *  1/1999

(Continued)

*Primary Examiner*—Tianjie Chen
(74) *Attorney, Agent, or Firm*—Brooks Kushman P.C.

(57) ABSTRACT

A tape cartridge for use with a tape drive having an actuation member includes a cartridge body that is insertable into the tape drive. The cartridge body includes first and second faces that extend at an angle to each other. The first face has a first opening and the second face has a second opening. The cartridge further includes a door movably associated with the cartridge body and being engageable with the actuation member when the cartridge body is inserted into the tape drive. The door is pivotable between a closed position and an open position upon engagement with the actuation member. Furthermore, the door has first and second portions that at least partially cover the first and second openings, respectively, when the door is in the closed position.

16 Claims, 6 Drawing Sheets

U.S. PATENT DOCUMENTS

| | | |
|---|---|---|
| 6,433,953 B1 | 8/2002 | Taki et al. |
| 6,445,539 B1 | 9/2002 | Morita et al. |
| 6,488,223 B1 | 12/2002 | Hayashi |
| 6,565,028 B2 | 5/2003 | Sasaki et al. |
| 6,581,865 B1 | 6/2003 | Zweighaft et al. |
| 6,604,701 B2 | 8/2003 | Hoge |
| 6,722,599 B2 * | 4/2004 | Hoge ................. 242/348.2 |
| 6,742,738 B2 | 6/2004 | Hiraguchi |
| 7,077,353 B1 | 7/2006 | Veno et al. |
| 2001/0035470 A1 | 11/2001 | Mizutani et al. |
| 2001/0055178 A1 * | 12/2001 | Stabile et al. ............. 360/94 |
| 2003/0209623 A1 | 11/2003 | Hoge |

FOREIGN PATENT DOCUMENTS

JP        2003030957 A  *   1/2003

* cited by examiner

TAPE CARTRIDGE WITH PIVOTABLE ACCESS DOOR

CROSS-REFERENCE TO RELATED APPLICATIONS

This application claims the benefit of U.S. provisional application Ser. No. 60/517,713, filed Nov. 5, 2003.

BACKGROUND OF THE INVENTION

1. Field of the Invention

The invention relates to a tape cartridge for use with a tape drive and having an access door.

2. Background Art

A tape cartridge typically includes magnetic tape wound on a supply reel. Data is read from or written to the tape by inserting the cartridge into a tape drive that includes a read/write head. The cartridge may also include an access door to protect the tape from damage. When the cartridge is inserted into the tape drive, the door is opened to expose the tape to the tape drive interior.

One known cartridge includes a pivotable door that opens upon engagement with a tab disposed on a tape drive. The cartridge further includes a hook that is spaced away from the door and that is engageable with a corresponding hook of the tape drive to retain the cartridge in the tape drive.

SUMMARY OF THE INVENTION

Under the invention, a tape cartridge for use with a tape drive having an actuation member is provided. The cartridge includes a cartridge body that is insertable into the tape drive. The cartridge body includes first and second faces that extend at an angle to each other. The first face has a first opening and the second face has a second opening. The cartridge further includes a door movably associated with the cartridge body and being engageable with the actuation member when the cartridge body is inserted into the tape drive. The door is pivotable between a closed position and an open position upon engagement with the actuation member. Furthermore, the door has first and second portions that at least partially cover the first and second openings, respectively, when the door is in the closed position.

Further under the invention, a tape cartridge and tape drive combination is provided. The combination comprises a tape cartridge including a cartridge body having first and second faces that extend at an angle to each other. The first face has a first opening and the second face has a second opening. The tape cartridge also includes a door movably associated with the cartridge body and being pivotable between a closed position and an open position. The door has first and second portions that at least partially cover the first and second openings, respectively, when the door is in the closed position. The combination further includes a tape drive configured to receive the tape cartridge. The tape drive includes an actuation member that engages the door and urges the door toward the open position when the tape cartridge is inserted into the tape drive.

While exemplary embodiments in accordance with the invention are illustrated and disclosed, such disclosure should not be construed to limit the claims. It is anticipated that various modifications and alternative designs may be made without departing from the scope of the invention.

DETAILED DESCRIPTION OF THE PREFERRED EMBODIMENT(S)

Figure 1:
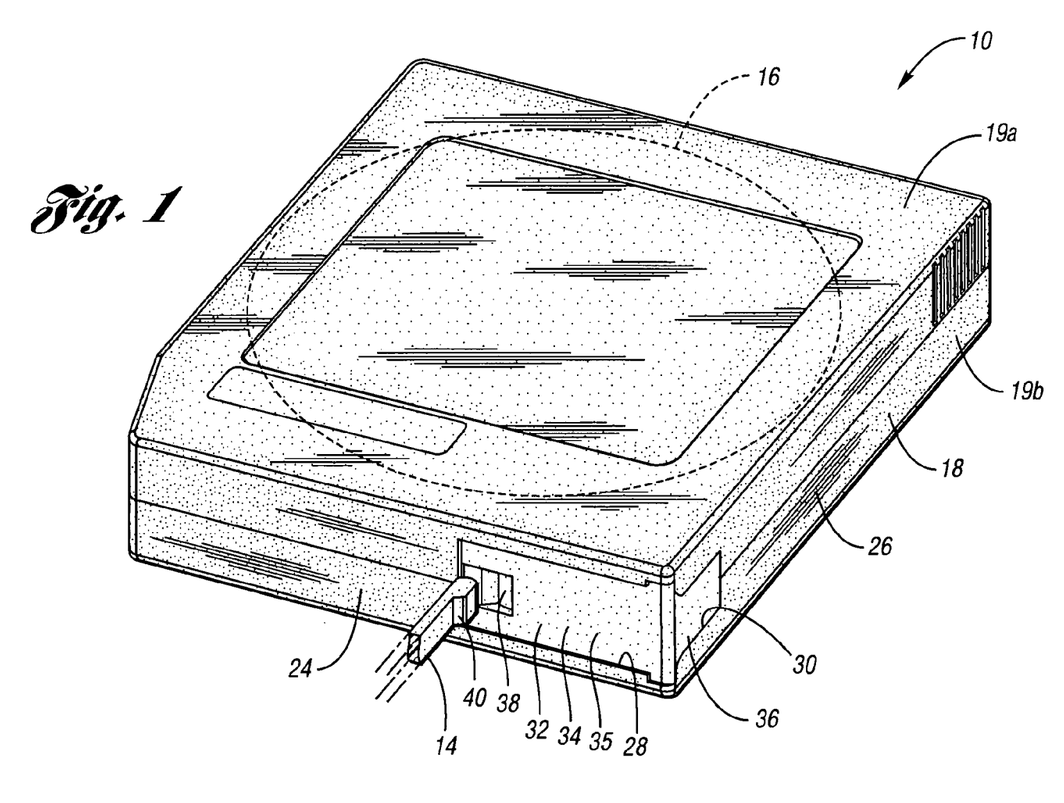
FIG. 1 is a fragmentary perspective view of a system according to the invention including a tape cartridge and a tape drive, wherein the tape cartridge includes a door that is shown in a closed position.
Figure 2:
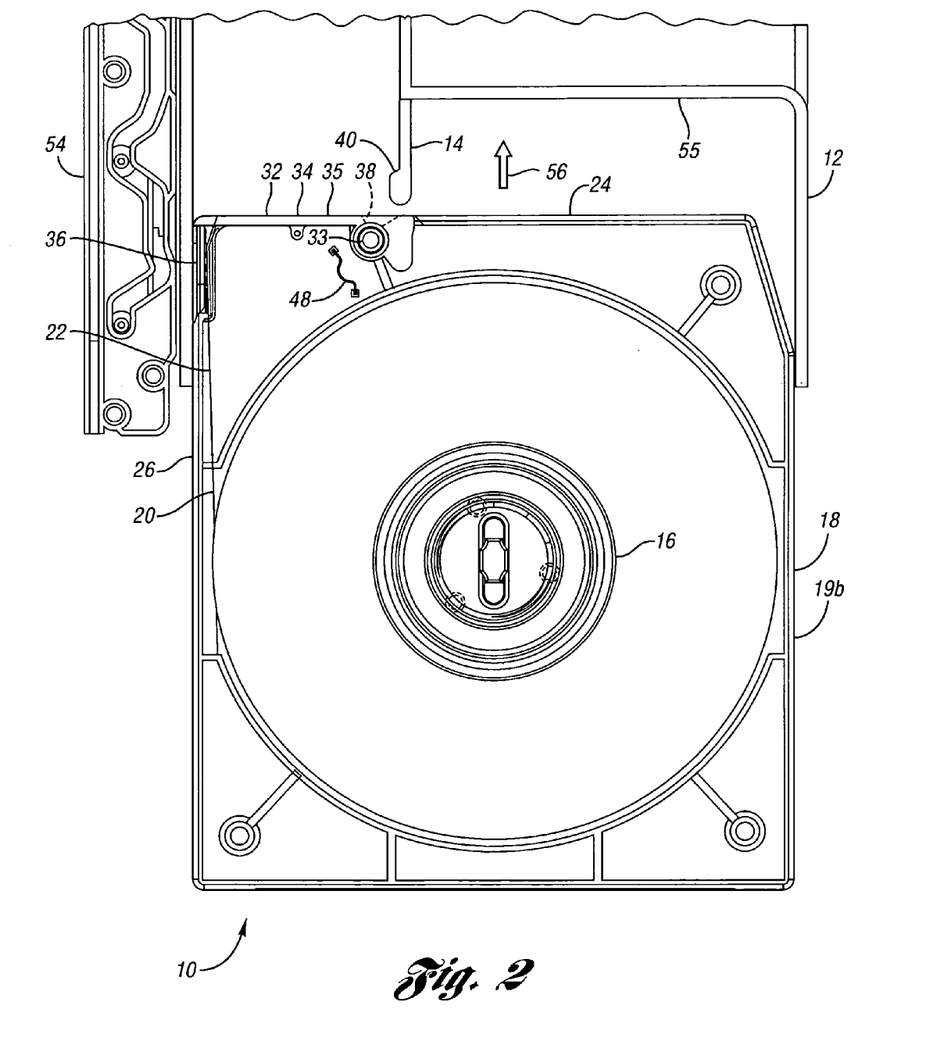
FIG. 2 is a fragmentary top view of the system of FIG. 1 with a top portion of the tape cartridge removed to expose an interior of the tape cartridge.

FIGS. 1 and 2 show a tape cartridge 10 according to the invention for use with a tape drive 12 having an actuation member 14. The cartridge 10 includes a supply reel 16 rotatably mounted on a housing or cartridge body 18. A length of magnetic tape 20 is wound on the supply reel 16, and a cartridge leader 22 is attached to a free end of the tape 20.

Referring to FIGS. 1-4, the cartridge body 18 supports the supply reel 16 and is configured to be inserted into the tape drive 12. As shown in FIG. 1, the cartridge body 18 may include first and second portions 19a and 19b, respectively, that are connected together. Furthermore, the cartridge body 18 has first and second adjacent faces 24 and 26, respectively, that extend at an angle to each other. In the embodiment shown in FIGS. 1-4, for example, the first face 24 is generally perpendicular to the second face 26. The first face 24 has a first opening 28 through which the tape 20 and cartridge leader 22 may travel. The second face 26 has a second opening 30 for allowing access to the cartridge leader 22, as explained below in detail.

The cartridge 10 further includes a door 32 movably associated with the cartridge body 18. For example, the door 32 may be pivotably mounted on a post 33 of the cartridge body 18. Moreover, the door 32 is movable between a closed position, shown in FIGS. 1 and 2, and an open position, shown in FIGS. 3 and 4, for allowing extraction of the cartridge leader 22 and tape 20.

In the closed position, the door 32 at least partially covers the first and second openings 28 and 30, respectively. In the embodiment shown in FIGS. 1 and 2, for example, the door 32 includes a main body 34 having first and second portions 35 and 36, respectively, that completely cover the first and second openings 28 and 30, respectively, when the door 32 is in the closed position.

Figure 5:
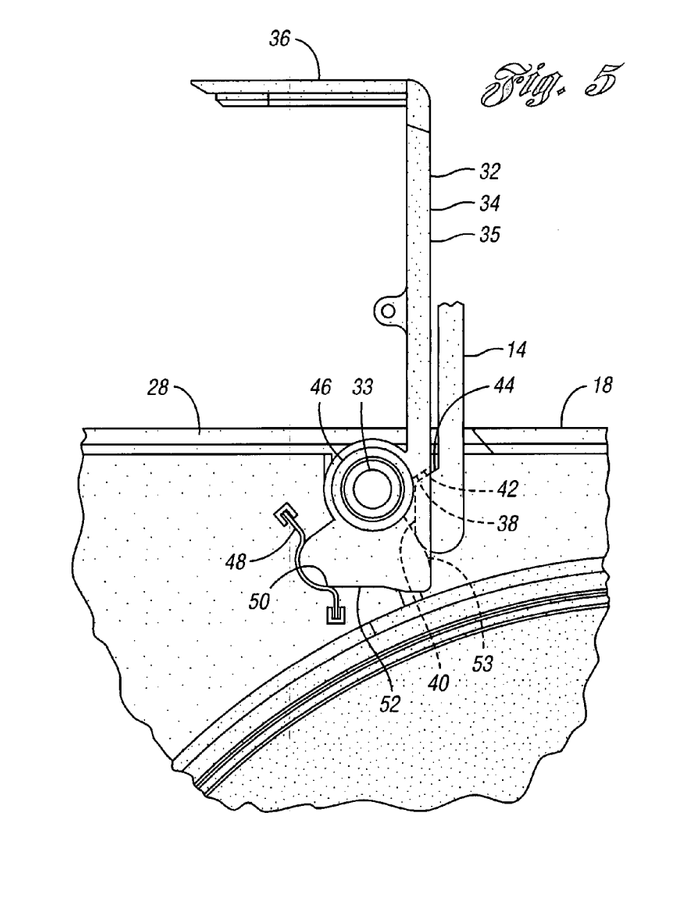
FIG. 5 is an enlarged view of a portion of the system of FIG. 4, showing the door engaged with a movement inhibitor of the tape cartridge.

Upon insertion of the cartridge 10 into the drive 12, the first portion 35 engages the actuation member 14, which causes the door 32 to pivot from the closed position to the open position. The door 32 may also include a retainer 38 that is engageable with the actuation member 14 when the door 32 is in the open position to facilitate retention of the cartridge body 18 in the tape drive 12. For example, the retainer 38 may be formed as a recess that engages a protrusion 40 of the actuation member 14 when the door 32 is in the open position. More specifically, referring to FIG. 5, the retainer 38 may include an angled surface 42 that engages an angled surface 44 of the protrusion 40 when the door 32 is in the open position.

Alternatively, the retainer 38 may have any suitable configuration that cooperates with the actuation member 14 to facilitate retention of the cartridge body 18 in the tape drive 12. For example, the retainer 38 may be formed as a protrusion that is engageable with a recess formed on the actuation member 14.

The cartridge 10 may further include a closure member 46 associated with the door 32 and configured to apply a closure force on the door 32, to thereby urge the door 32 toward the closed position. For example, the closure member 46 may be a torsion spring disposed about the post 33 and engaged with the drive body 18 and the door 32.

In addition, the cartridge 10 may include a movement inhibitor 48 associated with the cartridge body 18 and engageable with the door 32 when the door 32 is in the open position for inhibiting movement of the door 32 toward the closed position. For example, the movement inhibitor 48 may be a flexible member, such as a spring, attached to or otherwise disposed on the drive body 18. Furthermore, the movement inhibitor 48 may include an engaging portion 50 that engages a protrusion 52, formed on the first portion 35 of the door 32, when the door 32 is in the open position.

The movement inhibitor 48 may have a spring force that is greater than the closure force applied by the closure member 46, such that the movement inhibitor 48 sufficiently holds the door 32 in the open position. When the spring force is sufficiently exceeded, the door 32 may move toward the closed position.

Figure 6:
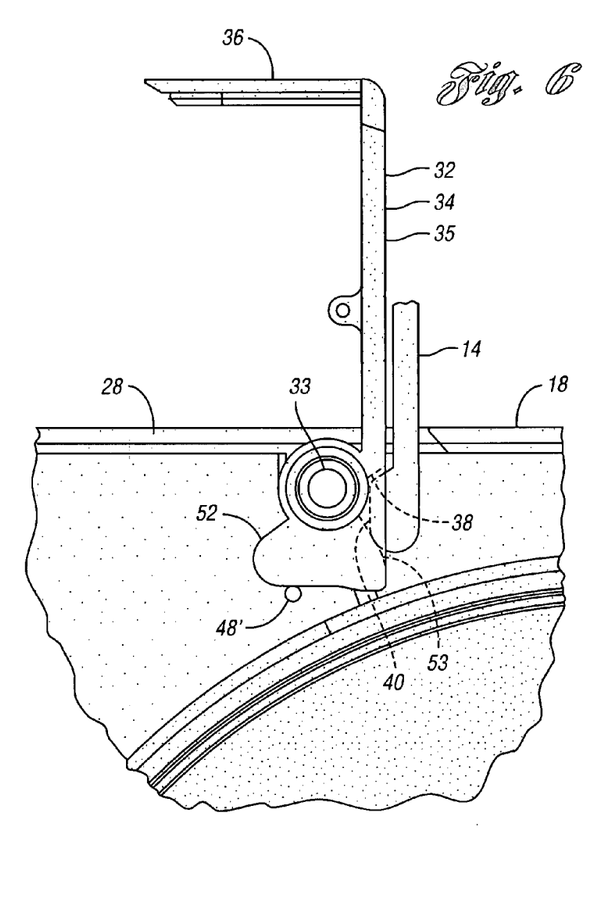
FIG. 6 is a view similar to FIG. 5 showing an alternate embodiment of the movement inhibitor.
Figure 7:
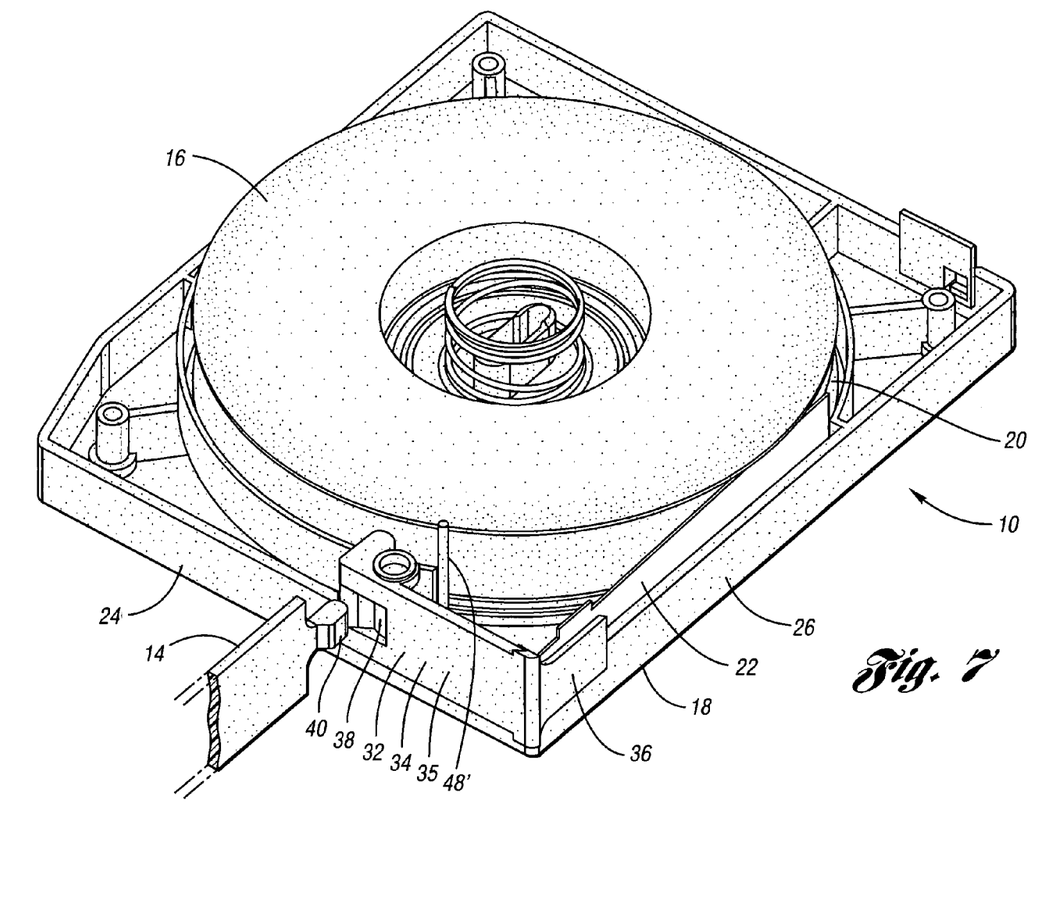
FIG. 7 is a fragmentary perspective view of the tape cartridge of FIG. 6 showing the door in the closed position.

FIGS. 6 and 7 show an alternate embodiment 48' of the movement inhibitor. The movement inhibitor 48' is formed as a flexible projection, such as a post, that extends from the cartridge body 18. The movement inhibitor 48' may be attached to the cartridge body 18 in any suitable manner, such as with adhesive or a fastener. Alternatively, the movement inhibitor 48' may be integrally formed with the cartridge body 18. For example, the movement inhibitor 48' and a portion of the cartridge body 18 may be formed in a molding operation, such as an injection molding operation.

Alternatively or supplementally, engagement of the door 32 with the actuation member 14 may inhibit movement of the door 32 toward the closed position. For example, the retainer 38 and/or extension 53 may function to inhibit movement of the door 32.

Figure 3:
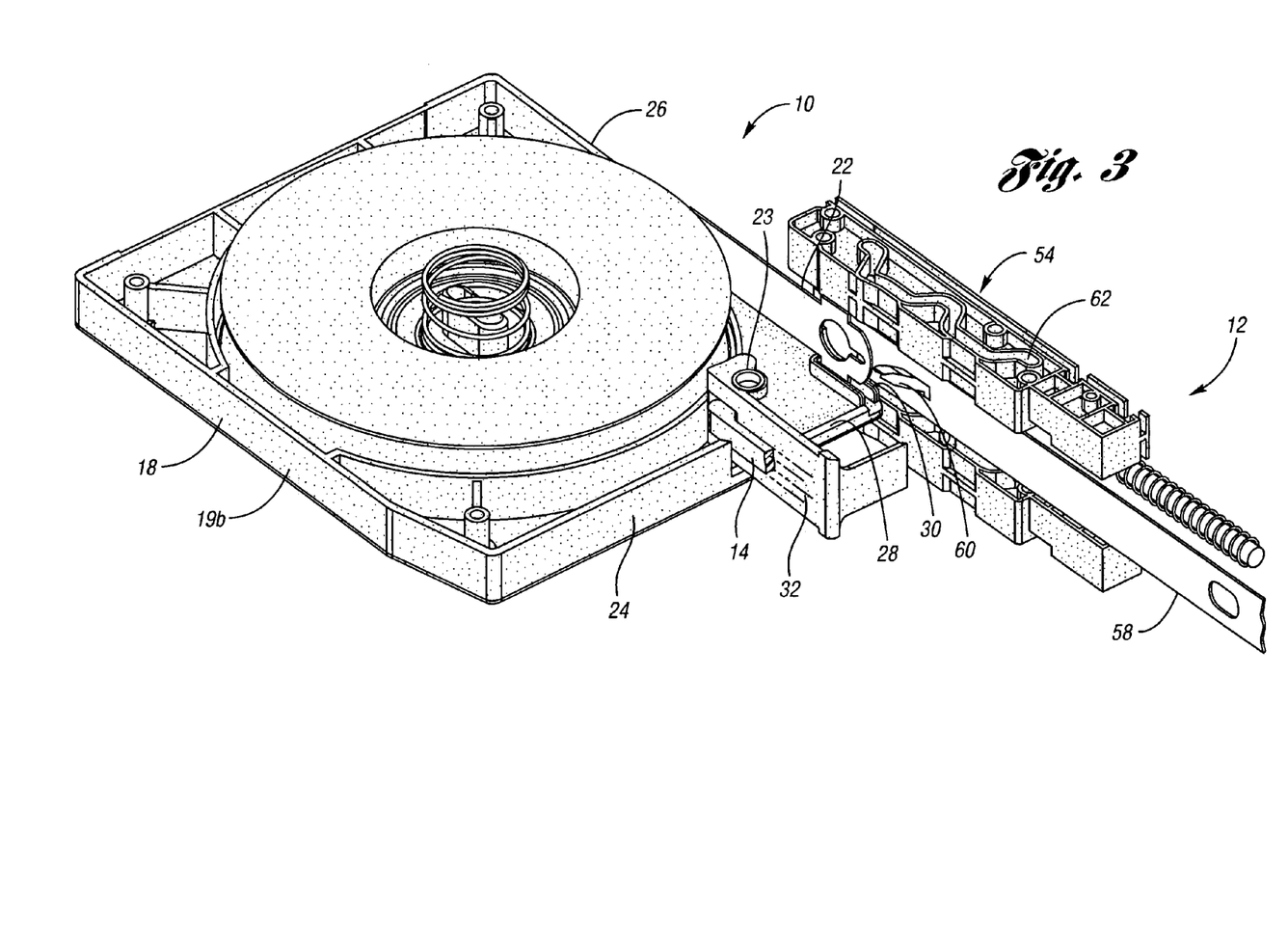
FIG. 3 is a fragmentary perspective view of the system of FIG. 2 showing the door of the tape cartridge in an open position.
Figure 4:
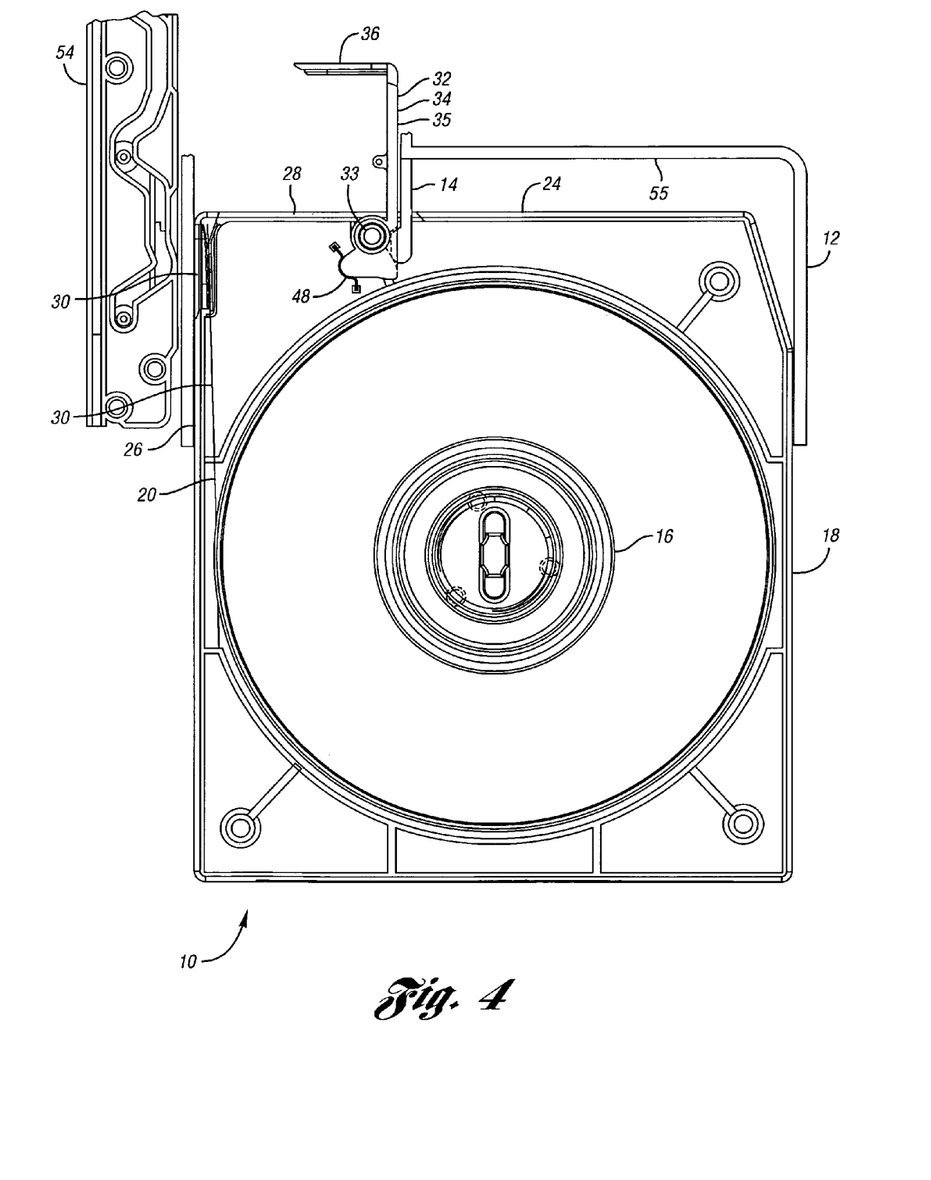
FIG. 4 is a view similar to FIG. 2 showing the door of the tape cartridge in the open position.

Referring to FIGS. 2 and 3, the tape drive 12 is configured to receive the cartridge 10 and to perform read and/or write operations on the tape 20. For example, the tape drive 12 may include a leader connecting mechanism 54, such as a buckling mechanism, for engaging the cartridge leader 22 and for routing the cartridge leader 22 to a take-up reel (not shown) of the tape drive 12. The tape drive 12 may then function to route the tape 20 across one or more read and/or write heads (not shown) for performing read and/or write operations on the tape 20.

The actuation member 14 may be mounted on any suitable portion of the tape drive 12. For example, the actuation member 14 may be fixed to a shuttle or elevator 55 that receives the cartridge 10 and moves the cartridge 10 onto a drive hub (not shown) of the tape drive 12.

Operation of the cartridge 10 and tape drive 12 will now be described. First, the cartridge 10 may be inserted into the tape drive 12, either manually or automatically. For example, referring to FIG. 2, an automatic insertion/extraction device, such as a library hand (not shown), may automatically insert the cartridge 10 into the tape drive 12 in a first direction 56 generally perpendicular to the first face 24. When the cartridge 10 is inserted into the tape drive 12, the actuation member 14 engages the door 32 and urges the door 32 to pivot from the closed position, shown in FIGS. 1 and 2, to the open position, shown in FIGS. 3 and 4.

In the open position, the door 32 engages the movement inhibitor 48, which sufficiently inhibits rotation of the door 32 toward the closed position. As a result, the door 32 is trapped against the actuation member 14 such that the retainer 38 of the door 32 sufficiently retains the cartridge 10 in the tape drive 12.

Once the door 32 is moved to the open position, the leader connecting mechanism 54 of the tape drive 12 may engage the cartridge leader 22 and route the cartridge leader 22 and the tape 20 to the take-up reel of the tape drive 12. For example, referring to FIG. 3, the leader connecting mechanism 54 may include a machine leader or drive leader 58 that is configured to be moved laterally through the second opening 30, and buckled or otherwise connected to the cartridge leader 22. After connecting to the cartridge leader 22, the drive leader 58 may be used to extract the cartridge leader 22 and tape 20 through the first opening 28 of the cartridge 10, and to route the cartridge leader 22 and tape 20 along a tape path (not shown) of the tape drive 12 to the take-up reel (not shown). More specifically, the take-up reel, which may be connected to the drive leader 58, may be rotated to draw the drive leader 58 and cartridge-leader 22 through the tape path. Next, the tape drive 12 may be used to perform read and/or write operations on the tape 20.

The leader connecting mechanism 54 may have any suitable configuration for connecting the drive leader 58 to the cartridge leader 22. For example, referring to FIG. 3, the leader connecting mechanism 54 may include an engaging member 60 that is engageable with the drive leader 58 and slidable along top and bottom tracks 62 (only the top track 62 is visible in FIG. 3) so as to engage a projection of the drive leader 58 with the cartridge leader 22. Additional details of the leader connecting mechanism 54, as well as details of another exemplary leader connecting mechanism, are disclosed in U.S. patent application Ser. No. 10/913,204, filed on Aug. 6, 2004, which is hereby incorporated by reference. Furthermore, the drive leader 58 may be considered part of the leader connecting mechanism 54, or the drive leader 58 may be considered as a separate component that is joined to the cartridge leader 22 by the leader connecting mechanism 54.

When it is desired to remove the cartridge 10 from the tape drive 12, a drive motor (not shown) of the tape drive 12 may be used to rewind the tape 20 onto the supply reel 16 of the cartridge 10. Next, a removal force may be applied to the cartridge 10 either manually or automatically. For example, a library hand may automatically extract the cartridge 10 from the tape drive 12. As a result, the spring force of the movement inhibitor 48 is overcome, and the door 32 is free to close with the assistance of the closure member 46. More specifically, as the cartridge 10 is extracted from the tape drive 12, the angled surface 44 of the actuation member 14 may engage the angled surface 42 of the door 32 and urge the door 32 toward the closed position, thereby disengaging the door 32 from the movement inhibitor 48.

With the configuration described above, the door 32 may be used to sufficiently cover both openings 28 and 30 of the cartridge 10 when the door 32 is in the closed position. As a result, the door 32 may effectively protect the tape 20 and cartridge leader 22 from damage and/or contamination.

Furthermore, the retainer 38, either alone or in cooperation with the movement inhibitor 48, may function to sufficiently retain the cartridge 10 in the tape drive 12. As a result, movement of the cartridge 10 due to such factors as environmental vibrations and/or drag forces applied by a library hand following cartridge insertion may be reduced or eliminated.

Advantageously, the cartridge 10 and actuation member 14 may be configured to achieve any desired retention force for the cartridge 10. For example, the cartridge 10 and actuation member 14 may be configured to achieve a retention force of one pound or less. Thus, in order to remove the cartridge 10 from the tape drive 12, a removal force in excess of the retention force would need to be applied to the cartridge 10, either manually or automatically.

Moreover, because the movement inhibitor 48 inhibits rotation of the door 32, ejection of the cartridge 10 resulting from the closure member 46 acting on the door 32 is inhibited. More specifically, the movement inhibitor 48 may prevent the door 32 from pivoting toward the closed position and pushing the cartridge 10 out of the tape drive 12.

In addition, because the actuation member 14 extends into the cartridge 10 when the cartridge 10 is inserted into the tape drive 12, the tape drive 12 may not accept cartridges that do not have an opening for receiving the actuation member 14. Thus, the actuation member 14 may function as a "keep out" mechanism for preventing undesired cartridges from being inserted into the tape drive 12.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A tape cartridge for use with a tape drive having an actuation member, the cartridge comprising:
    a cartridge body that is insertable into the tape drive, the cartridge body including first and second faces that extend at an angle to each other, the first face having a first opening and the second face having a second opening;
    a door movably associated with the cartridge body and being engageable with the actuation member when the cartridge body is inserted into the tape drive, the door being pivotable between a closed position and an open position upon engagement with the actuation member, wherein the door has first and second portions that at least partially cover the first and second openings, respectively, when the door is in the closed position;
    a supply reel supported by the cartridge body;
    magnetic tape wound onto the supply reel; and
    a cartridge leader connected to the tape;
    wherein the first opening is configured to allow the tape to pass therethrough, and the second opening is configured to allow access to the cartridge leader, and wherein the first opening is further configured to receive the actuation member when the cartridge body is inserted into the tape drive.

2. The tape cartridge of claim 1 wherein the first and second faces are generally perpendicular to each other.

3. The tape cartridge of claim 1 wherein when the door is in the open position, the first opening is configured to receive the actuation member on a first side of the door and to allow the tape to pass therethrough on an opposite second side of the door.

4. The tape cartridge of claim 1 wherein the door is configured to pivot about a pivot point proximate the first face.

5. The tape cartridge of claim 1 wherein the door is configured to pivot about a pivot point proximate the first face.

6. A tape cartridge and tape drive combination comprising:
    a tape cartridge including a cartridge body having first and second faces that extend at an angle to each other, the first face having a first opening and the second face having a second opening, the tape cartridge further including a door movably associated with the cartridge body and being pivotable between a closed position and an open position, wherein the door has first and second portions that at least partially cover the first and second openings, respectively, when the door is in the closed position, the tape cartridge further including a supply reel supported by the cartridge body, magnetic tape wound onto the supply reel, and a cartridge leader connected to the tape, wherein the first opening is configured to allow the tape to pass therethrough, and the second opening is configured to allow access to the cartridge leader; and
    a tape drive configured to receive the tape cartridge and including an actuation member that engages the door and urges the door toward the open position when the tape cartridge is inserted into the tape drive;
    wherein the first opening is further configured to receive the actuation member when the cartridge body is inserted into the tape drive.

7. The combination of claim 6 wherein the tape drive includes a drive leader that is configured to access the cartridge leader through the second opening in the cartridge body.

8. The combination of claim 6 wherein the first and second faces of the cartridge body are generally perpendicular to each other.

9. The tape cartridge of claim 6 wherein when the door is in the open position, the first opening is configured to receive the actuation member on a first side of the door and to allow the tape to pass therethrough on an opposite second side of the door.

10. The tape cartridge of claim 6 wherein the door is configured to pivot about a pivot point proximate the first face.

11. A tape cartridge for use with a tape drive having an actuation member, the cartridge comprising:
    a cartridge body that is insertable into the tape drive, the cartridge body including first and second faces that extend at an angle to each other, the first face having a first opening and the second face having a second opening; and
    a door movably associated with the cartridge body and being engageable with the actuation member when the cartridge body is inserted into the tape drive, the door being pivotable between a closed position and an open position upon engagement with the actuation member, wherein the door is configured to pivot about a pivot point proximate the first face and has first and second portions that at least partially cover the first and second openings, respectively, when the door is in the closed position, and wherein the first opening is configured to receive the actuation member when the cartridge body is inserted into the tape drive.

12. The tape cartridge of claim 11 further comprising tape received in the cartridge body, wherein the first opening is further configured to allow the tape to pass therethrough.

13. The tape cartridge of claim 12 wherein when the door is in the open position, the first opening is configured to receive the actuation member on a first side of the door and to allow tape to pass therethrough on an opposite second side of the door.

14. The tape cartridge of claim 12 further comprising a cartridge leader connected to the tape, wherein the second opening is configured to allow access to the cartridge leader.

15. The tape cartridge of claim 11 further comprising tape received in the cartridge body and a cartridge leader connected to the tape, wherein the second opening is configured to allow access to the cartridge leader.

16. The tape cartridge of claim 11 further comprising a supply reel supported by the cartridge body, and tape wound onto the supply reel, wherein the first opening is further configured to allow the tape to pass therethrough.

* * * * *